United States Patent [19]
Yamasaki et al.

[11] Patent Number: 5,868,934
[45] Date of Patent: Feb. 9, 1999

[54] METHOD AND APPARATUS FOR ORGANIC WASTEWATER TREATMENT CAPABLE OF PREVENTING DECREASE IN PERMEATION EFFICIENCY OF SUBMERGED MEMBRANE WITHOUT DILUTION

[75] Inventors: Kazuyuki Yamasaki, Hiroshima; Atsushi Yokotani; Kazuyuki Sakata, both of Fukuyama, all of Japan

[73] Assignee: Sharp Kabushiki Kaisha, Osaka, Japan

[21] Appl. No.: 828,301

[22] Filed: Mar. 28, 1997

[30] Foreign Application Priority Data

May 28, 1996 [JP] Japan ................................. 8-133249

[51] Int. Cl.$^6$ ..................................................... C02F 3/30
[52] U.S. Cl. ........................... 210/605; 210/609; 210/625; 210/195.2; 210/195.3; 210/202
[58] Field of Search ..................... 210/605, 609, 210/620, 623, 624, 625, 630, 195.1, 195.2, 195.3, 202, 209, 256, 257.2, 259, 903

[56] References Cited

U.S. PATENT DOCUMENTS

| | | | |
|---|---|---|---|
| 4,790,939 | 12/1988 | Suzuki et al. | 210/625 |
| 5,151,187 | 9/1992 | Behmann | 210/195.2 |
| 5,578,214 | 11/1996 | Yamasaki et al. | 210/625 |
| 5,702,604 | 12/1997 | Yamasaki et al. | 210/605 |

FOREIGN PATENT DOCUMENTS

| | | |
|---|---|---|
| 54-107153 | 8/1979 | Japan . |
| 03232597 A | 10/1991 | Japan . |
| 04313400 A | 11/1992 | Japan . |
| 889631 | 12/1981 | U.S.S.R. . |

*Primary Examiner*—Christopher Upton
*Attorney, Agent, or Firm*—Nixon & Vanderhye, P.C.

[57] ABSTRACT

A method and apparatus for wastewater treatment is provided which can prevent any decrease in permeation efficiency of a submerged membrane without involving an increase in operating cost and sludge generation, and which can treat high concentration organic wastewater efficiently and without dilution. The wastewater treatment method has the steps of: concentrating domestic sludge by means of a first submerged membrane to produce thick sludge; mixing the thick sludge into a water to be treated, and introducing the water to be treated which is so mixed with the thick sludge into an anaerobic treatment portion for anaerobically treating the same; and introducing the anaerobically treated water from the anaerobic treatment portion into an aerobic treatment portion having a second submerged membrane disposed therein to subject the water to aerobic treatment. The water to be treated undergoes treatment with the thick sludge through which its dissolved oxygen content is reduced to zero and organic substances contained therein are adsorbed by the sludge for subsequent treatment in the anaerobic treatment portion.

6 Claims, 5 Drawing Sheets

METHOD AND APPARATUS FOR ORGANIC WASTEWATER TREATMENT CAPABLE OF PREVENTING DECREASE IN PERMEATION EFFICIENCY OF SUBMERGED MEMBRANE WITHOUT DILUTION

BACKGROUND OF THE INVENTION

The present invention relates to a wastewater treatment method and apparatus for treating organic wastewater having oil and fatty oil contents.

Generally, organic wastewater of high concentration is discharged from many industrial facilities, research laboratories, and the like. When treating such high concentration organic wastewater with a typical conventional activated sludge, it has been usual practice to dilute the high concentration organic wastewater to facilitate treatment thereof in case where inflow high concentration organic wastewater is of too high concentration for treatment with the activated sludge. However, such practice of diluting high concentration organic wastewater in treating the wastewater involves a disadvantage that a wastewater treatment apparatus of greater size is required, which means increased capital expenditure. Therefore, a need exists for a compact wastewater treatment apparatus which can treat high concentration organic wastewater without dilution being required.

In such a situation, a more recent practice in the art of wastewater treatment is to utilize submerged membranes. The term "submerged membrane" herein means an ultrafiltration film or membrane or a precision filtration film or membrane as disposed in tank water for use in wastewater treatment.

By using such a submerged membrane it is possible to carry out wastewater treatment in such a condition that the concentration of microorganisms within the aeration tank is increased up to two times to six times the microbial concentration level usual in the case of a conventional activated sludge process. This not only makes it possible to provide a compact arrangement for wastewater treatment, but also enables high concentration organic wastewater to be effectively treated without being diluted.

Generally, in biological wastewater treatment under the activated sludge process which utilizes microorganisms, inflow water is pretreated for water quality adjustment in respect of quality factors, such as pH, BOD (biochemical oxygen demand), and COD (chemical oxygen demand), thereby to facilitate biological treatment.

In biological treatment, it is important to pretreat the water to be treated in such a way as to facilitate treatment by microorganisms. If pretreatment is not carried out, adequate microbial treatment capability cannot be obtained, and there may often occur an abnormal phenomenon such as bulking (abnormal growth of stringy microorganisms on the activated sludge which hinders sludge settlement) and so on, which is peculiar to microbial treatment operations.

As earlier stated, prior art pretreatment includes chemical neutralization for pH adjustment, and dilution for adjustment of BOD and COD.

A wastewater treatment apparatus of the type shown in FIG. 5 is generally known for treating with microorganisms high concentration organic wastewater in which suspended solids are present but in an extremely small amount. This apparatus includes an anaerobic tank 101 and an aerobic tank 102. Water to be treated is first anaerobically treated in the anaerobic tank 101. Shown by 103 is a submerged agitator. The water which has been anaerobically treated in the anaerobic tank 101 is then caused to flow into the aerobic tank 102. In the aerobic tank 102, the water is aerobically treated and is allowed to pass through a submerged membrane 6 before it reaches a submerged membrane draw pump 108. Then, the water passes sequentially through a secondary treatment unit 110 and a tertiary treatment tank 111 before it is discharged as treated water. A nutrient is added into the aerobic tank 102 from a nutrient tank 112 through a pump 113. The nutrient is a feed for aerobic microorganisms, Also, a liquid for generating suspended solids (SS) is added into the aerobic tank 102 from a suspension tank 115 via a pump 116. Disposed in the aerobic tank 102 is a submerged pump 117 which has a function to return sludge settled on the bottom of the aerobic tank 102 to the anaerobic tank 101 and a sludge treatment unit 118.

In a wastewater treatment apparatus of the type shown in FIG. 5 wherein water is treated by means of a combination of aerobic tank and anaerobic tank, the anaerobic tank has an important position. In particular, it has been found that in a wastewater treatment apparatus such that submerged membrane 106 is disposed in aerobic tank 102, as shown in FIG. 5, conditions for treatment in the anaerobic tank 101 is a factor having great bearing upon the permeation efficiency of the submerged membrane 106. In other words, oily substances contained in the water to be treated must be thoroughly anaerobically treated in the anaerobic tank 101, otherwise the permeation efficiency of the submerged membrane 106 in the aerobic tank 102 is seriously lowered. Such possible decrease in the permeation efficiency of the submerged membrane 106 remains as a problem yet to be solved.

As a more recent development, various kinds of wastewater treatment apparatus and sludge treatment apparatus have been proposed including those disclosed in Japanese Patent Application Laid-Open Nos. 3-232597 and 4-313400.

The sludge treatment apparatus disclosed in JP Laid-Open No. 3-232597 represents a proposal for solving the problem of possible decrease in permeation efficiency due to adhesion to an ultrafiltration membrane of oily matter contained in sewage sludge such that a coagulant is added into sewage tank for removing such oily matter. However, the use of a coagulant involves increase operating cost and, in addition, sludge generation.

Another problem is that in the FIG. 5 apparatus and JP 3-232597 apparatus, water to be treated is introduced into the anaerobic tank in such a condition that dissolved oxygen content of the water remains untreated, with the result that the anaerobic tank is not in a condition favorable to anaerobic microorganisms. In other words, when water to be treated which contains dissolved oxygen is introduced into the anaerobic tank 101, the anaerobic atmosphere is rendered incomplete in a portion of the anaerobic tank 101, with the result that anaerobic microbial activity cannot be actively effected.

More specifically, by way of example, problems with microbial treatment of developer liquor containing wastewater, as high density organic wastewater, discharged from a semiconductor plant or liquid crystal plant, will be discussed in detail. Such developer liquor containing wastewater contains Tetramethyl Ammonium Hydroxide (hereinafter referred to as TMAH) which exhibits biotoxicity on the order of 2000 to 10000 ppm. The developer liquor containing wastewater contains, in addition to TMAH, surfactant and resist (photoresist) or colored oily and fatty matter, which are persistent substances to various kinds of microorganisms. Unfortunately, such developer liquor containing wastewater does not contain phosphorus, a substance necessary for microbial propagation, or SS (suspended solid), a material for microbial deposition, at all. Generally, for purposes of microbial treatment, an ideal quality of inflow water (water to be treated) is such that the ratio of BOD (biochemical oxygen demand) to N (nitrogen) to P (phosphorus) is 100:5:1 and that the water contains adequate SS. Therefore, if the water does not contain any phosphorus or SS at all, it is necessary to add phosphorus, as a micro ingredient, and adequate SS to the water to be treated.

In particular, any developer liquor containing wastewater discharged from a semiconductor plant or a similar plant contains BOD and nitrogen, but does not contain phosphorus or adequate SS at all. Further, such developer liquor containing wastewater contains surfactant that is persistent to microorganisms and has foaming characteristics. Examples of such persistent surfactant include alkyl ammonium-family surfactant and polyoxyethylene-family surfactant. It has been experimentally proved that such persistent and foamable surfactant can be treated by exceedingly increasing microbial concentration through utilization of a submerged membrane.

Therefore, when treating developer liquor containing wastewater from a semiconductor plant in the anaerobic tank 101 and aerobic tank 102 with the submerged membrane 106 as shown in FIG. 5, it is necessary that phosphorus, as a nutrient necessary for propagation of microorganisms, be added in the form of phosphoric acid from the nutrient tank 112 into the aerobic tank 112. It is also necessary that a liquid for generating SS, i. e., suspended solid (for example, waste milk powder liquid or the like) be supplied from the suspended solid tank 115 into the aerobic tank 102 in large quantities. Addition of phosphoric acid, as well as addition of a liquid for generating SS, involves increased operating cost.

However, unless such addition of phosphorus acid and SS-generating liquid is carried out, microbial concentration is rendered insufficient, with the result that foaming due to surfactant contained in developer liquor containing wastewater will occur. Further, activated sludge adheres to the resulting bubbles and flows outward of the aerobic tank and, as a result, aerobic treatment is rendered impossible.

SUMMARY OF THE INVENTION

Therefore, it is an object of the present invention to provide a method and apparatus for wastewater treatment which can prevent any decrease in the permeation efficiency of the submerged membrane without involving an increase in operating cost and sludge generation, and which can treat high concentration organic wastewater efficiently and without dilution.

For purposes of treating surfactant in a developer liquid-containing wastewater, as a high concentration organic wastewater, by enhancing microbial concentration in the wastewater through the utilization of a submerged membrane, it is necessary to maintain the permeation efficiency of the submerged membrane over a long period of time, which determines the wastewater treatment capability and reliability of the wastewater treatment system. Therefore, in order to provide steady supply of treated water, it is very important to maintain good permeation efficiency of the submerged membrane.

As a result of extensive study by the present inventors on the problem of permeation efficiency of submerged membranes, it has been found that in the case of submerged membrane treatment of wastewater of the type which contains resist, as an oily and fatty matter, and has no such content as phosphorus or SS-generating liquid, it is essential that the resist content, or an oil/fatty oil content, has been positively treated in a preceding anaerobic treatment section to enable good permeation efficiency of the submerged membrane to be maintained in a subsequent aerobic treatment section.

Also, it has been found that the following three conditions are important for maintaining high permeation efficiency of the submerged membrane in the aerobic treatment section over a long period of time: that (1) the anaerobic microbial concentration in the anaerobic treatment section be maintained high; (2) pretreatment be carried out in such a way that the concentration of dissolved oxygen content of the water be in a substantially zero condition in the anaerobic section; and (3) thick sludge be introduced into the anaerobic section in such a condition that organic matter, i. e., the oily and fatty matter, such as resist, in the water to be treated has been adsorbed onto the thick sludge.

In order to achieve the aforementioned object, a method for wastewater treatment in accordance with the present invention comprises concentrating sludge by means of a first submerged membrane to produce thick sludge;

mixing the thick sludge into a water to be treated, and introducing the water to be treated which is so mixed with thick sludge into an anaerobic treatment portion for anaerobically treating the water, and introducing the anaerobically treated water from the anaerobic treatment portion into an aerobic treatment portion having a second submerged membrane disposed therein to subject the water to aerobic treatment.

According to the wastewater treatment method of the invention, the water to be treated and the thick sludge concentrated by the submerged membrane are previously mixed together, Therefore, the organic matter, such as oily and fatty matter, in the water to be treated can be adsorbed by the thick sludge.

From the view point of dissolved oxygen treatment, dissolved oxygen in the water to be treated is digested by anaerobic microorganisms in the thick sludge and is reduced to zero. Thus, the thick sludge and the water to be treated are thoroughly mixed, and a thick sludge containing water to be treated, with dissolved oxygen reduced to zero, is introduced into the anaerobic treatment portion.

Here, organic matter adsorption by thick sludge is explained. A typical example of organic matter is oil and fatty matter. Such organic matter (oil and fatty matter) is adsorbed by tar-like thick sludge that has been concentrated by the submerged membrane. It is generally known that activated sludge has some adsorption capability, though rather weak. In the present invention, such weak adsorptivity of sludge is upgraded through concentration of the sludge so that the resulting thick sludge can exhibit good adsorption capability. This is one important feature of the invention. The oil and fatty matter adsorbed by thick sludge are decomposed by microorganisms in the tar-like thick sludge which is in effect a microbial mass. With regard to the decomposition of such oil and fatty matter, experiments were conducted for comparison between the case in which such oil and fatty matter were subjected to adsorption treatment by such tar-like thick sludge and the case in which no such treatment was made. The experiments showed the following results.

(Experimental results)

Where organic wastewater (with oily and fatty matter content of 100 ppm) was treated by a submerged membrane but without adsorption treatment by thick sludge, the permeation efficiency of the submerged membrane was lowered by 30% in one month. In contrast, where organic wastewater (with oily and fatty matter content of 100 ppm) was treated by a submerged membrane in conjunction with adsorption treatment by thick sludge, no change was observed in the permeation efficiency of the submerged membrane even after a lapse of three months. It is noted that the expression "oily and fatty matter content of 100 ppm" means that the amount of normal hexane extraction material (according to JIS K102 Measurement Method) is 100 ppm.

According to the above experimental results, when 20% tar-like thick sludge (20000 ppm of MLSS(Mixed Liquor Suspended Solid)) is added to 100 ppm of normal hexane extraction material, the extracted material is eliminated by the thick sludge to a concentration of 26 ppm. The effect of adsorption by the tar-like thick sludge does not mean improvement in the quality of treated water, but means that the permeation efficiency of the submerged membrane can be maintained good over a long period of time.

In the case where adsorption treatment by thick sludge was not carried out, treatment by a submerged membrane of a waste water containing 100 ppm of normal hexane extraction material resulted in a decrease of 30% in the quantity of water permeation (permeation efficiency). This is attributable to the fact that adhesion of oily and fatty matter to minute pores in the surface of the submerged membrane hindered passage of water molecules through such pores. As a result, adequate water permeation could not be obtained.

According to the invention, into the anaerobic treatment portion is gradually introduced water under treatment which has been pretreated to a dissolved oxygen free level and whose organic contents, such as oil and fatty matter, have been adsorbed onto thick sludge. Therefore, water under treatment can be anaerobically treated in a more efficient way.

In an embodiment, the thick sludge is produced by concentrating a domestic sludge by means of the first submerged membrane.

The domestic sludge as concentrated by means of the submerged membrane can concentrate MLSS (Mixed Liquor Suspended Solid) up to a level of 20000 to 30000 ppm. The resulting high concentration thick sludge has the following features: (1) the thick sludge contains phosphorus; (2) the thick sludge is capable of organic substance adsorption; (3) the thick sludge primarily contains SS (suspended solid); and in addition, (4) the thick sludge is capable of readily digesting dissolved oxygen.

Therefore, the thick sludge has a tar-like configuration, with a microbial concentration of 20000 ppm to 30000 ppm in MLSS, and is highly capable of organic substance adsorption. Therefore, the thick sludge can adsorb organic substances, such as oil and fatty matter, in the water being treated in a more efficient manner and, in addition, can reduce the dissolved oxygen in the water to zero in a short time period.

Further, the thick sludge, which is primarily domestic sludge, contains therein phosphorus and an adequate quantity of SS and can enhance microbial growth and propagation within the anaerobic treatment portion even if the water to be treatment is a developer liquor-containing wastewater which has no phosphorus or SS content. This eliminates the need for any device designed for addition of phosphorus or an SS generating liquid. As sludge digestion proceeds in the anaerobic treatment portion, there occurs a decrease in the quantity of sludge in that portion. In this conjunction, domestic sludge is constantly available at any industrial establishment as long as workers are employed there. Any sludge needs due to sludge digestion in the anaerobic treatment portion can be readily met by replenishment supply from such sludge source.

In an embodiment, the thick sludge produced by sludge concentration by means of the first submerged membrane, and a thick sludge produced by sludge concentration by means of the second submerged membrane, are mixed into the water to be treated, and the water to be treated which is so mixed with thick sludges is introduced into the anaerobic treatment portion for being subjected to anaerobic treatment.

According to this embodiment, the thick sludge contains sludge originating from the water being treated, so that the sludge introduced in the anaerobic treatment portion is inured to the characteristic configuration of the water being treated. This provides for improvement in anaerobic treatment efficiency. At the same time, any surplus domestic sludge can be utilized for purposes of treating organic wastewater, which in effect means effective resource utilization.

The present invention provides an apparatus for organic wastewater treatment comprising: a concentration tank for concentrating sludge by means of a first submerged membrane to produce thick sludge;

an organic matter adsorption tank for receiving the thick sludge from the concentration tank and organic wastewater as water to be treated, mixing the thick sludge and the organic wastewater together, thereby causing organic matter contained in the organic wastewater to be adsorbed on the thick sludge; and an anaerobic-aerobic treatment tank including an anaerobic treatment portion into which organic wastewater mixed with the thick sludge is introduced from the organic matter adsorption tank, and an aerobic treatment portion into which an anaerobically treated water is introduced from the anaerobic treatment portion, the aerobic treatment portion including a second submerged membrane.

According to this invention, the water to be treated is treated so that organic substances, such as oil and fatty matter, are adsorbed by the thick sludge and, in addition, dissolved oxygen is reduced to zero. After having undergone such pretreatment, the organic wastewater is introduced into the anaerobic treatment portion. Therefore, it is possible to treat the organic wastewater in an efficient manner and without any decrease in the permeation efficiency of the second submerged membrane due to the organic wastewater.

Further, according to this invention, the organic wastewater is treated with a thick sludge such that its microbial concentration has been exceedingly enhanced through the utilization of the first submerged membrane and, therefore, it is not only possible to positively treat TMAH in a high concentration developer liquor-containing wastewater, but also to positively treat even surfactant contained therein.

The basic concept of the wastewater treatment apparatus of this invention is that organic substances (including oil and fatty matter) in organic wastewater are adsorbed onto thick sludge that has been concentrated by means of the first submerged membrane to a higher degree of concentration; that dissolved oxygen in the organic wastewater is reduced to zero by the thick sludge; and that the organic substances are then anaerobically treated in the anaerobic treatment portion.

In an embodiment, the concentration tank receives a sludge of domestic sludge type for concentration therein by means of the first submerged membrane.

According to this embodiment, the concentration tank can provide an anaerobic domestic sludge which is highly capable of dissolved oxygen digestion and has a tar-like configuration. A high concentration domestic sludge is mixed with the water to be treated in the organic matter adsorption tank. The high concentration domestic sludge has the following features: (1) the sludge contains phosphorus, (2) the sludge is capable of organic matter adsorption, (3) the sludge primarily contains SS, and in addition, (4) the sludge is capable of readily digesting dissolved oxygen. A water-sludge mixture from the organic matter adsorption tank in which the high concentration domestic sludge and the water to be treated are mixed together is introduced into the anaerobic treatment portion for anaerobic treatment. According to this embodiment, therefore, the anaerobic treatment capability of the anaerobic treatment portion is improved, and the permeation efficiency of the second submerged membrane in the aerobic treatment portion can be maintained at a higher level.

An embodiment further comprises a sludge return device for introducing the thick sludge produced by the second submerged membrane of the anaerobic-aerobic treatment tank into the concentration tank.

According to this embodiment, a thick sludge as concentrated by the second submerged membrane which has been inured to the configuration of the water under treatment is returned by the sludge return device to the concentration tank. The so returned thick sludge is introduced into the anaerobic treatment portion via the concentration tank and the organic matter adsorption tank. This provides for improvement of the anaerobic treatment efficiency in the anaerobic treatment portion.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The invention will now be described in further detail with reference to the accompanying drawings which illustrate the preferred embodiments of the invention.

(First Embodiment)

Figure 1:
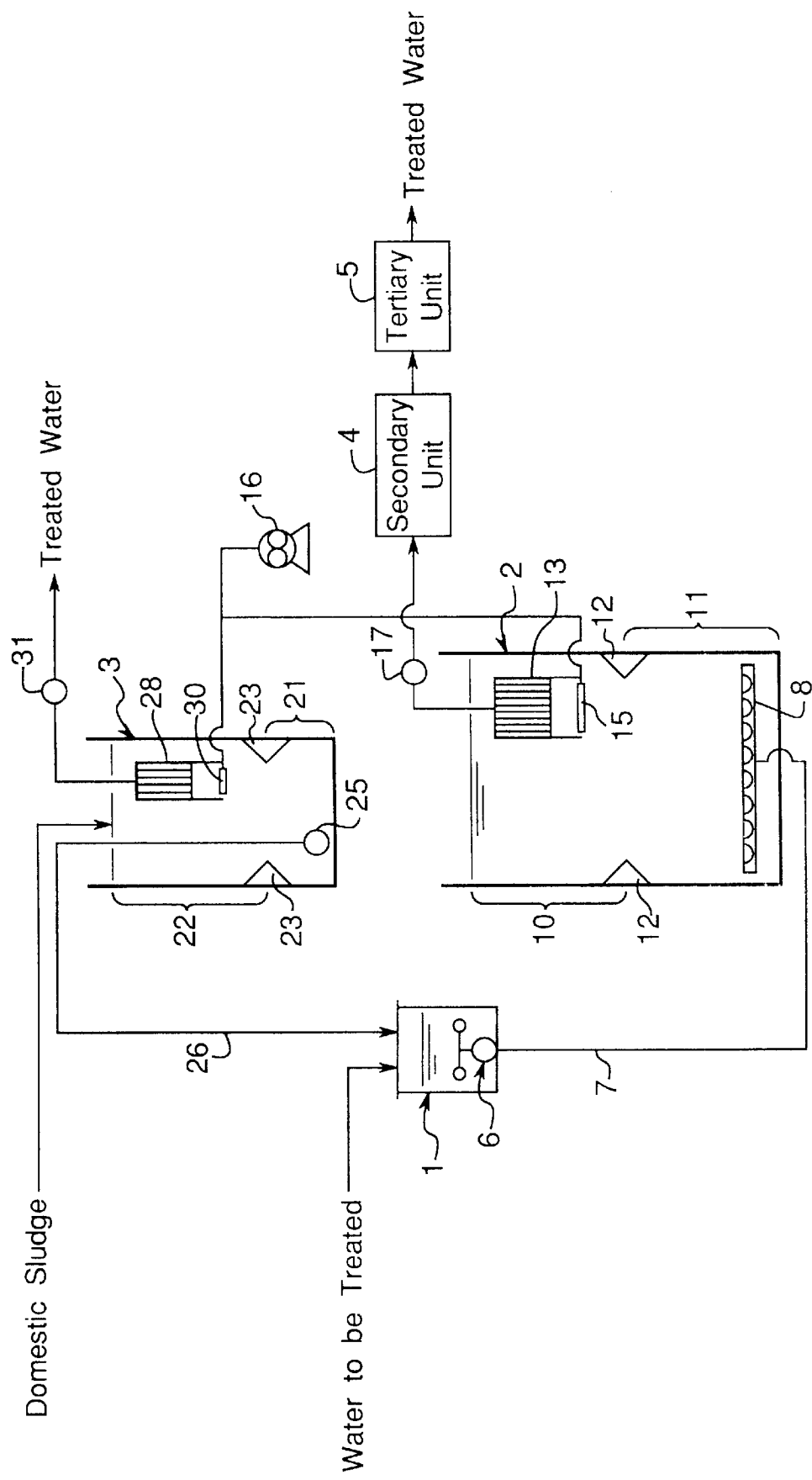
FIG. 1 is a schematic view of a first embodiment of organic wastewater treatment apparatus in accordance with the present invention.

FIG. 1 schematically shows a first embodiment of an organic wastewater treatment apparatus in accordance with the invention. The apparatus of this embodiment includes an organic matter adsorption tank 1, an anaerobic-aerobic treatment tank 2, a domestic sludge anaerobic-aerobic concentration tank 3, a secondary treatment unit 4, and a tertiary treatment unit 5.

The organic matter adsorption tank 1 includes a submerged agitator 6. The bottom of the organic matter adsorption tank 1 is connected through an introduction pipe 7 to an influent pipe 8 disposed at the bottom of the anaerobic-aerobic treatment tank 2.

The anaerobic-aerobic treatment tank 2 has an aerobic portion 10 in an upper portion thereof, and an anaerobic portion 11 in a lower portion thereof. The aerobic portion 10 and the anaerobic portion 11 are partially separated from each other by a separation wall 12. The separation wall 12 is fixed to a side wall of the treatment tank 2 at a level that is slightly lower than a level corresponding to a midpoint of the height of the side wall. The separation wall 12 is tapered inward of the side wall to define a triangular sectional configuration as shown in FIG. 1.

The aerobic portion 10 includes a second submerged membrane 13 disposed somewhat close to the side wall. An aeration pipe 15 is disposed below the second submerged membrane 13. The aeration pipe 15 is connected to a blower 16. An upper portion of the second submerged membrane 13 is connected through an introduction pipe to a submerged membrane draw pump 17 disposed outside the tank which in turn is connected to the secondary treatment unit 4 through an introduction pipe. The secondary treatment unit 4 is connected to the tertiary treatment unit 5.

The domestic sludge anaerobic-aerobic concentration tank 3 is adapted to receive domestic sludge that originates from living sewage, and has an anaerobic portion 21 in a lower portion thereof and an aerobic portion 22 in an upper portion thereof. The aerobic portion 22 and the anaerobic portion 21 are partially partitioned from each other by a separation wall 23. The separation wall 23 is fixed to a side wall of the concentration tank 3 at a level that is slightly lower than a level corresponding to a midpoint of the height of the side wall. The separation wall 23 is tapered inward of the side wall to define a triangular sectional configuration as shown in FIG. 1.

Disposed at the bottom of the anaerobic portion 21 is a submersible pump 25 which is connected to the organic matter adsorption tank 1 through an introduction pipe 26. The aeration zone 22 includes a first submerged membrane 28. The first submerged membrane 28 is disposed adjacent to the side wall, and below the submerged membrane 28 there is disposed an aeration pipe 30 which is connected to a blower 16. An upper portion of the first submerged membrane 28 is connected to a submerged membrane draw pump 31 disposed outside the tank. Treated water is drawn from this submerged membrane draw pump 31.

For use as submerged membranes 13, 28 to be placed at respective underwater locations, for example, ultra-filtration membrane (made by Kubota Corporation) or precision filtration membrane (made by Mitsubishi Rayon Co.) may be suitably selected. In the present embodiment, the above mentioned ultra-filtration membrane is used. The ultra-filtration membrane is comprised of a flat polyethylene film.

In the above described wastewater treatment apparatus, water to be treated, that is, organic plant-effluent, more specifically, a developer liquid-containing wastewater, is introduced into the organic matter adsorption tank 1. Further, a high concentration thick sludge of anaerobic nature which contains phosphorus and SS is introduced into this organic matter adsorption tank 1 from the anaerobic portion 21 of the domestic sludge anaerobic-aerobic concentration tank 3.

The submerged agitator 6 in the organic matter adsorption tank 1 agitates and mixes the organic wastewater and high concentration thick sludge together in anaerobic condition. In addition to the submerged agitator 6, a conventional agitator of land type may be used without any trouble whatsoever. For agitation purposes, air agitation may be conceivable, but such agitation method is not employed for the purpose of the present invention, because it is likely to cause an increase in dissolved oxygen concentration.

Staying time of the water to be treated in the organic matter adsorption tank 1 may vary according to the quality of organic wastewater, but is one hour or more in the present case. When the microbial concentration within the adsorption tank 1 is 15000 ppm, water to be treated that has a dissolved oxygen concentration of 5 ppm is added thereto and mixing is effected for 10 minutes, whereby the dissolved oxygen concentration is reduced to 0 ppm.

Air to be discharged from the aeration pipes 15 and 30 is supplied from the blower 16. The quantity of air discharged from the aeration pipes 15 and 30 is regulated to 10 liters per minute for each constituent film sheet of submerged membrane 13, 28 (made by Kubota Corporation).

The water under treatment that has been filtered by submerged membrane 13, 28 is discharged by submerged membrane draw pump 17, 31 from anaerobic-aerobic treatment tank 2 and concentration tank 3.

The submerged pump 25 set in the anaerobic portion 21 of the domestic sludge anaerobic-aerobic concentration tank 3 transfers anaerobic thick sludge to the organic matter adsorption tank 1 through the introduction pipe 26. The ratio of the quantity of thick sludge to be so transferred to the quantity of water to be treated is 1 to 5 in the case where the BOD of the water to be treated, that is, high concentration organic wastewater, is 3000 to 10000 ppm. However, this ratio of 1 to 5 should not be taken as an absolute one, and a suitable ratio may be determined according to the quality of the high concentration organic wastewater and other relevant factor.

In the organic matter adsorption tank 1, the water to be treated is mixed with thick sludge under stirring so that organic substances including oil and fatty matter are adsorbed onto thick sludge until the dissolved oxygen content is reduced to zero. The so treated water is then slowly introduced into the anaerobic portion 11 of the anaerobic-aerobic treatment tank 2. The anaerobic-aerobic treatment tank 2 has two portions defined by the separation wall 12, namely, upper aerobic portion 10 and lower anaerobic portion 11. Therefore, the microbial concentration of the lower anaerobic portion 11 is higher than that of the upper aerobic portion 10 so that the water is first treated under the condition of higher microbial concentration in the anaerobic portion 11.

In the upper aerobic portion 10, the second submerged membrane 13, disposed therein in the same manner as in the domestic sludge anaerobic-aerobic concentration tank 3, performs a function to enhance the microbial concentration within the anaerobic-aerobic treatment tank 2. Further, the submerged membrane draw pump 17 acts in cooperation with the second submerged membrane 13 to draw the water being treated from the aerobic portion 10 and toward the secondary treatment unit 4.

The water that has been anaerobically treated in the lower anaerobic portion 11 flows upward to enter the upper aerobic portion 10 in which the water is aerobically treated. It is noted that the quantity of air discharged from the aeration pipe 15 located below the second submerged membrane 13 is arranged to be same as that from the aeration pipe 30 of the concentration tank 3. The staying of the water under treatment in the anaerobic-aerobic treatment tank 2 is 10 days or more where, as in this case, the organic wastewater is a developer liquid-containing wastewater. However, this staying time should not be taken as an absolute one, and a suitable staying time should be determined according to the quality of the inflow organic wastewater and the target quality of treated water.

The organic wastewater, before it reaches the second submerged membrane 13 of the aerobic portion 10, has undergone treatment such that organic substances including oil and fatty matter are adsorbed onto thick sludge, the dissolved oxygen content is reduced to zero, and further the water is treated under the condition of high microbial concentration in the anaerobic portion 11. Therefore, the permeation efficiency of the second submerged membrane 13 can be maintained high over a long time period.

During the 10 days or more stay of the water in the anaerobic-aerobic treatment tank 2, sludge is digested by microorganisms in the anaerobic portion 11, so that the possibility of excess sludge generation can be eliminated. In other words, introduction of concentrated domestic sludge from the domestic sludge concentration tank 3 through the organic matter adsorption tank 1 does not result in excess sludge generation. It is noted, however, that excess sludge generation may occur depending upon the quality of the water to be treated. In such a case, a surplus sludge treatment unit (not shown) may be provided.

The water filtered through the second submerged membrane 13 is discharged by the submerged membrane draw pump 17 for being fed into the secondary treatment unit 4 in which the water is subjected to secondary treatment. Subsequently, the water is introduced into the tertiary treatment unit 5 in which it is subjected to tertiary treatment, whereupon a final treated water is obtained.

Specifications for the secondary treatment unit 4 and tertiary treatment unit 5 may be determined according to the desired quality of treated water. For example, in case where the water to be treated is a developer liquid-containing waste water, the water from the submerged membrane draw pump 17 is such that BOD is of the order of 100 ppm and COD is of the order of 200 ppm, and if BOD and COD concentration values lower than aforesaid levels are required, it is necessary to provide a biological treatment unit as secondary treatment unit 4 and an activated carbon adsorption unit as tertiary treatment unit 5.

In the anaerobic portion 11 of the anaerobic-aerobic treatment tank 2, sludge digestion proceeds. Therefore, even if thick sludge from the domestic sludge anaerobic-aerobic concentration tank 3 is continually introduced into the anaerobic-aerobic treatment tank 2, the sludge concentration will not continue to increase. In the event of any excessive rise in sludge concentration in the anaerobic-aerobic treatment tank 2, the quantity of thick sludge to be introduced from the concentration tank 3 into the adsorption tank 1 may be simply decreased.

Thus, according to the arrangement of the present embodiment, any separate addition of phosphorus and/or SS is not required, and it is possible to prevent any decrease in the permeation efficiency of the submerged membrane without involving an increase in operating cost and sludge generation as often encountered heretofore, and to treat high concentration organic wastewater efficiently and without dilution.

(Second Embodiment)

Figure 2:
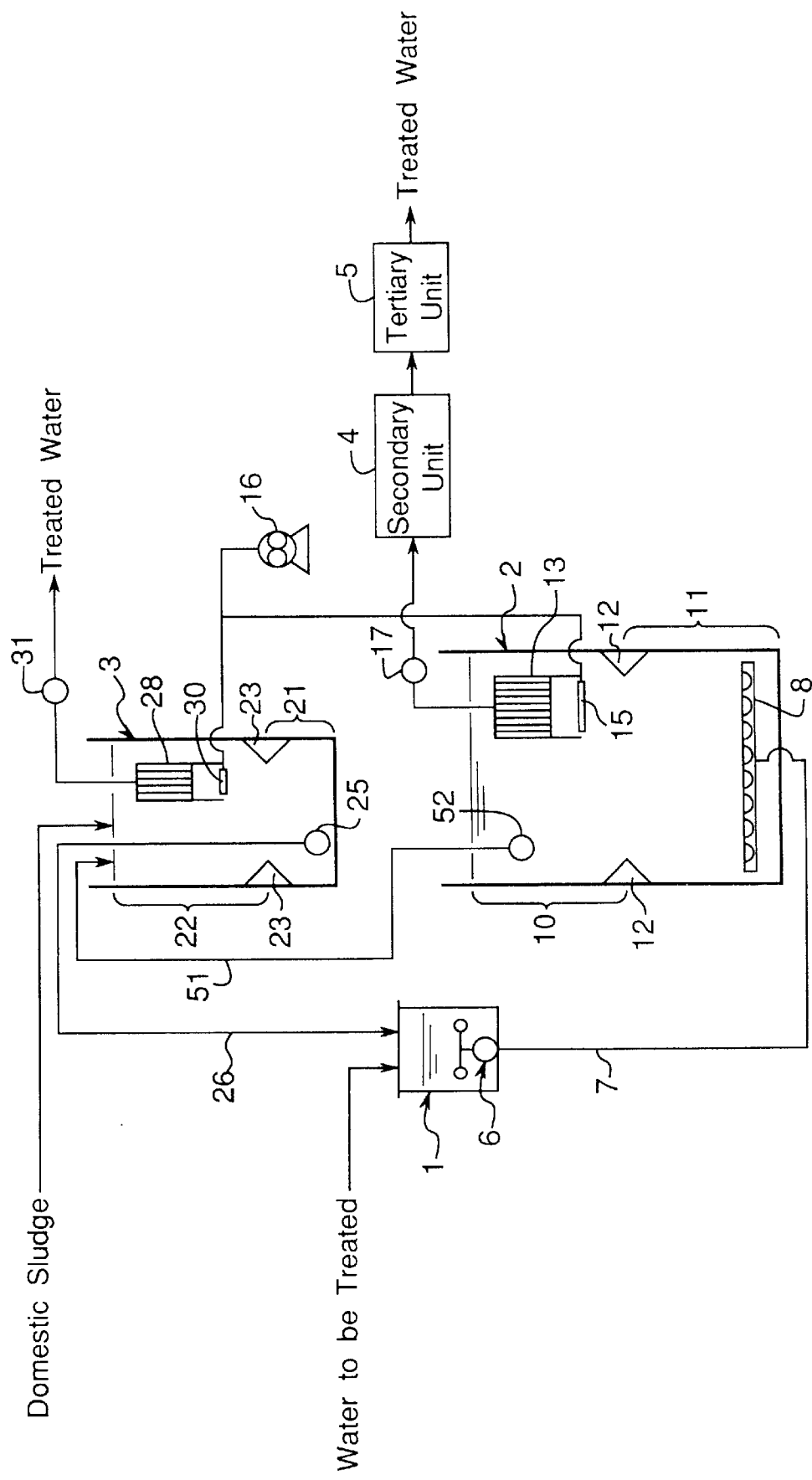
FIG. 2 is a schematic view of a second embodiment of organic wastewater treatment apparatus of the invention.

FIG. 2 shows a second embodiment of a wastewater treatment apparatus in accordance with the invention. In the second embodiment, it is arranged that sludge recycling is carried out, and the apparatus differs from the first embodiment of FIG. 1 only in that a submerged pump 52 connected to an introduction pipe 51 which leads to the aerobic portion 22 of the concentration tank 3 is disposed in the aerobic portion 10 of the anaerobic-aerobic treatment tank 2 and at a position slightly above a level corresponding to the middle of the height or depth of the aerobic portion 10. The same parts of the second embodiment as those of the first embodiment are designated by the same reference numerals.

The submerged pump 52 is operative to transfer thick sludge present in the aerobic portion 10 to the concentration tank 3 through the introduction pipe 51. Thus, thick sludge inured to the water present in the aerobic portion 10 can be mixed with domestic sludge in the concentration tank 3. Sludge returned from the aerobic portion 10 to the concentration tank 3 is a sludge produced through utilization of the under-treatment water as a substrate and is therefore a sludge adapted for easy treatment of organic substances present in the water to be treated. Aforesaid sludge return can draw the following advantages: that (1) microorganisms treating and suiting the water to be treated can be supplied into the concentration tank 3; (2) that thick sludge, as waste, which is formed by decomposition of organic substances, such as oil and fatty matter, in the anaerobic-aerobic treatment tank 2 is returned to the domestic sludge anaerobic-aerobic concentration tank 3 so as to be utilized for replenishment of phosphorus and SS to the concentration tank 3 and for inurement of sludge to the water being treated; and (3) that the quantity of sludge in the anaerobic-aerobic treatment tank 2 can be reduced so that the concentration of sludge therein is maintained to a proper degree.

(Third Embodiment)

Figure 3:
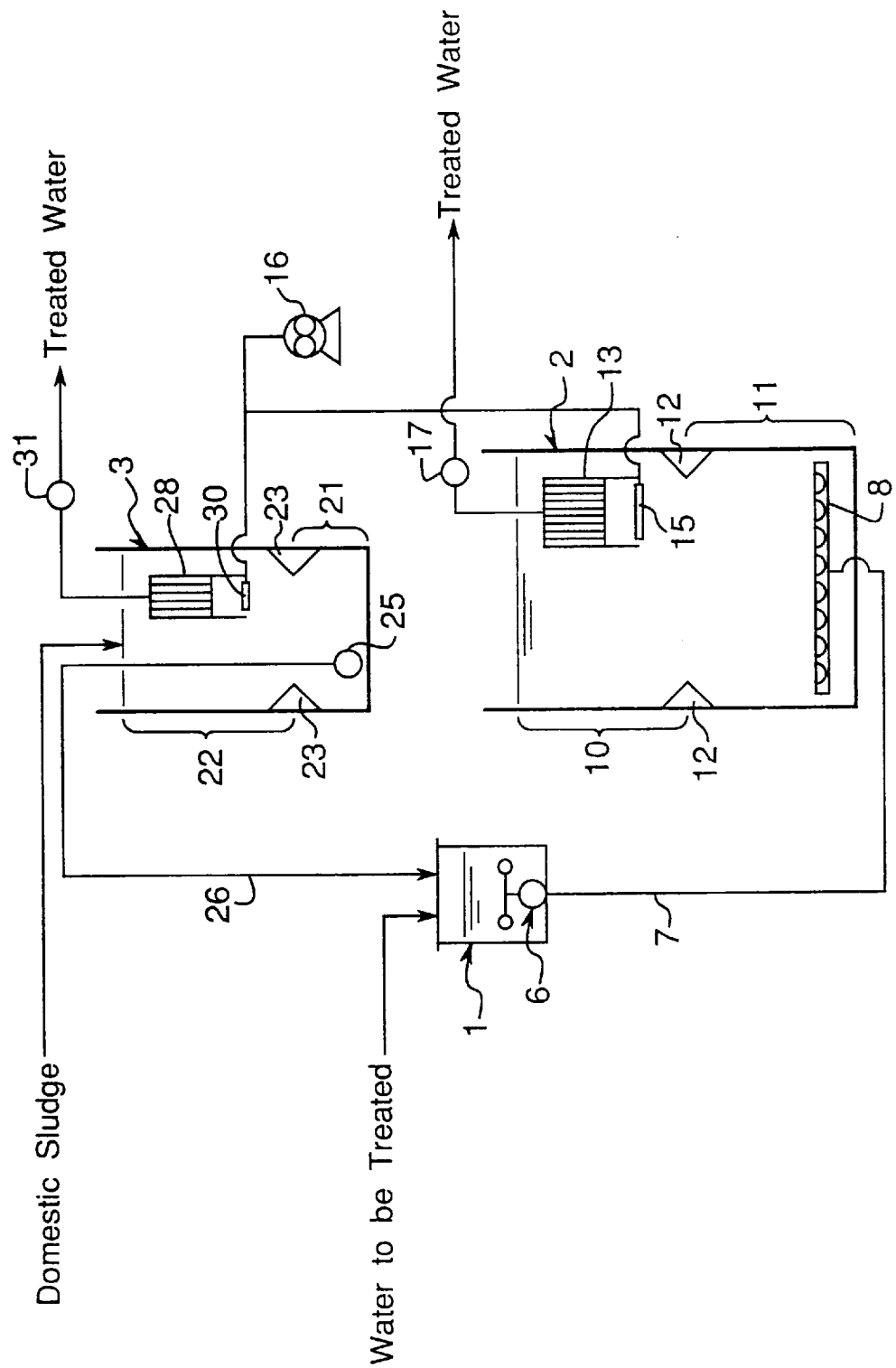
FIG. 3 is a schematic view of a third embodiment of organic wastewater treatment apparatus of the invention.

FIG. 3 shows a third embodiment of the wastewater treatment apparatus according to the invention. This embodiment is such that both the secondary treatment unit 4 and the tertiary treatment unit 5 are eliminated from the arrangement of the first embodiment shown in FIG. 1, so that water drawn through the submerged membrane draw pump 17 is utilized as treated water as it is.

In case where organic wastewater of lower concentration is treated in contrast to the case of the first embodiment for treatment of high concentration organic wastewater, the secondary and tertiary treating units may be dispensed with as in this third embodiment. For aforesaid organic wastewater of lower concentration, one criterion to be relied upon is that BOD is not more than 300 ppm.

(Fourth Embodiment)

Figure 4:
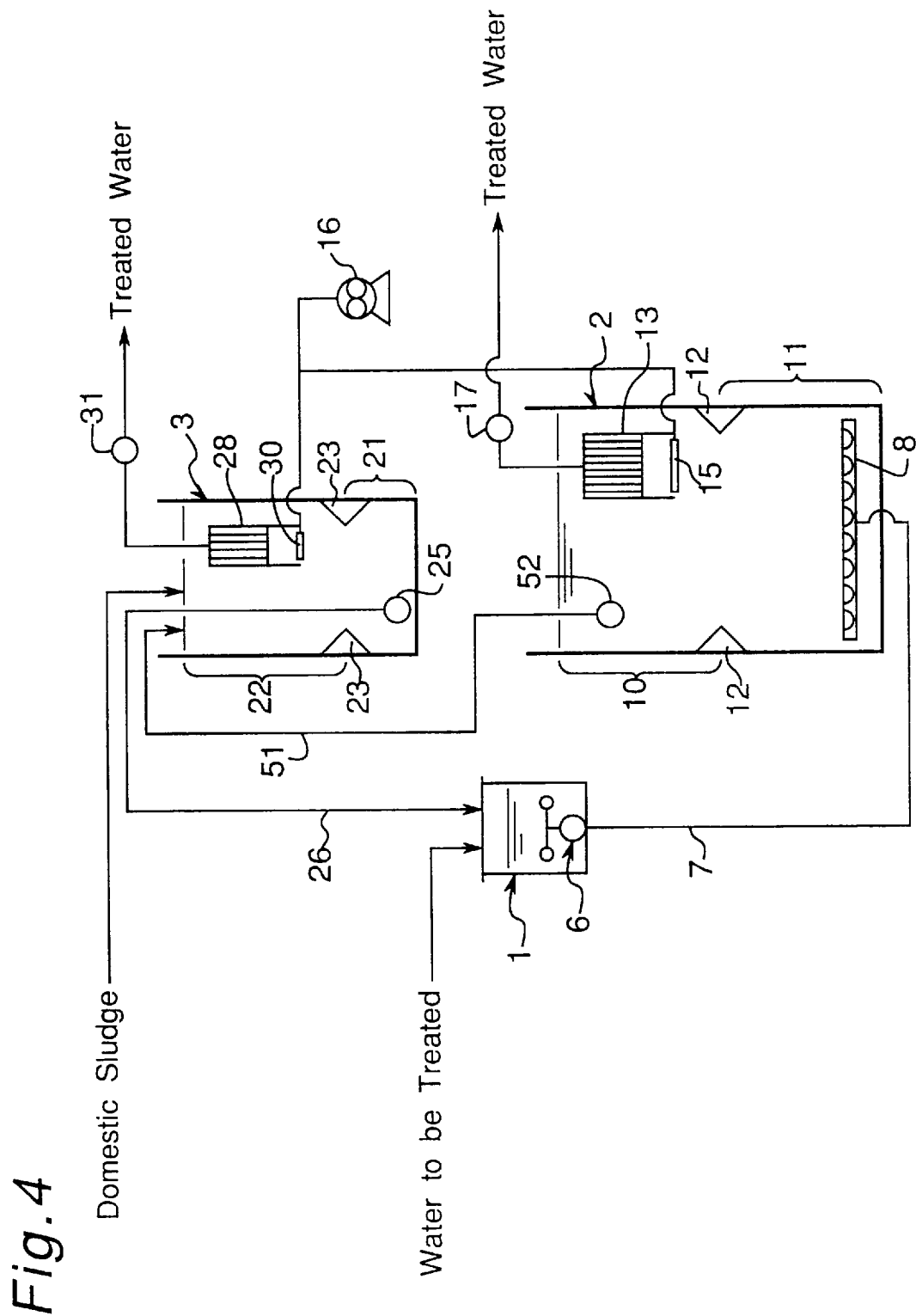
FIG. 4 is a schematic view of a fourth embodiment of organic wastewater treatment apparatus of the invention.
Figure 5:
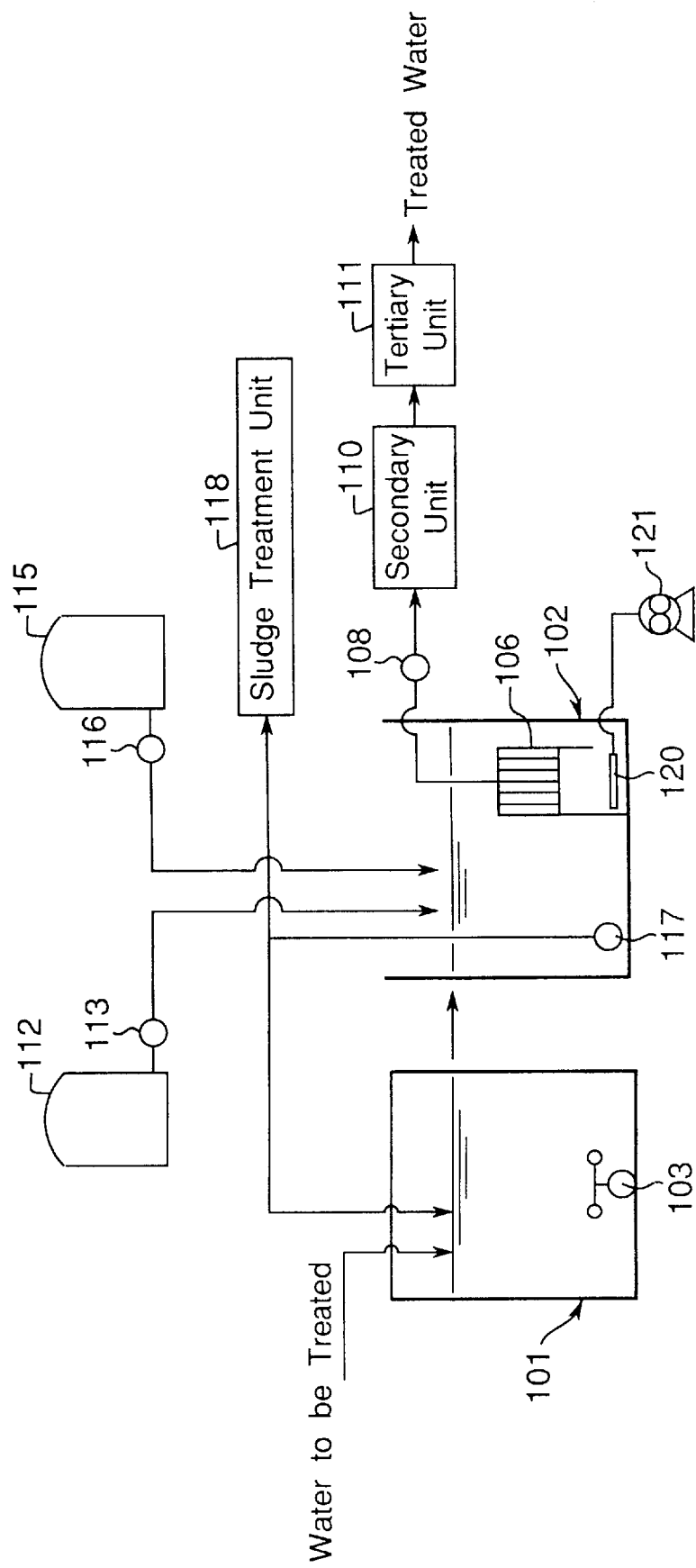
FIG. 5 is a schematic view of a conventional type wastewater treatment apparatus.

FIG. 4 shows a fourth embodiment of the wastewater treatment apparatus according to the invention. This embodiment is such that water drawn through the submerged membrane draw pump 17 of the second embodiment shown in FIG. 2 is utilized as treated water as it is. As in the case of the third embodiment, this fourth embodiment is applicable where the water to be treated is an organic wastewater of low concentration. For the purpose of treating such low concentration organic wastewater, both the secondary and tertiary treatment units may be eliminated so that some saving can be achieved in capital expenditure and operating cost.

EXAMPLE

Next, with respect to the first embodiment illustrated in FIG. 1, one experimental example is given. In this example, the organic matter adsorption tank 1 had a size of 1.5 m×1.5 m×2.0 m. The domestic sludge anaerobic-aerobic concentration tank 3 had a size of 3 m×4 m×4 m. The anaerobic-aerobic treatment tank 2 had a size of 7 m×15 m×9 m. A developer liquid-containing wastewater was introduced into the organic matter adsorption tank 1. Meanwhile, domestic sludge was introduced into the domestic sludge anaerobic-aerobic concentration tank 3. Trial operation was carried out for about 3 months.

At an initial stage of trial operation, the anaerobic-aerobic treatment tank 2 had a microbial concentration of 6000 ppm in MLSS (mixed liquor suspended solid), and two months later, the MLSS concentration increased to 20000 ppm. Also, into the organic matter adsorption tank 1 was introduced a thick sludge such that domestic sludge was previously concentrated to an MLSS concentration of 20000 ppm in the domestic sludge anaerobic-aerobic concentration tank 3 so that the concentrated sludge had a tar-like configuration.

After the end of the trial operation, measurements were carried out over a period of 3 days with respect to the quality of developer liquid-containing wastewater and the quality of treated water drawn by submerged membrane draw pump 17 from submerged membrane 13 set in the anaerobic-aerobic treatment tank 2. Measurement data collected are summarized as follows.

(Quality of FIG. 1 water to be treated)

| | |
|---|---|
| pH | 11 or higher |
| BOD | 2500 ppm or less |
| COD | 2600 ppm or less |
| TOC | 4000 ppm or less |
| TMAH | 7800 ppm or less |
| SS | 35 ppm or less |
| Total nitrogen | 800 ppm or less |
| Cationic surfactant | 33 ppm or less |
| Anionic surfactant | 6 ppm or less |
| Chromaticity | 4500 degree or less |

(Quality of water at outlet of submerged membrane draw pump 17 in FIG. 1)

| | |
|---|---|
| pH | 6.1 to 7.4 |
| BOD | 100 ppm or less |
| COD | 200 ppm or less |
| TOC | 200 ppm or less |
| TMAH | 1 ppm or less |
| SS | 1 ppm or less |
| Total nitrogen | 200 ppm or less |
| Cationic surfactant | 1 ppm or less |
| Anionic surfactant | 1 ppm or less |
| Chromaticity | 100 degree or less |

As may be clearly understood from the above measurement results, the water treated in the anaerobic-aerobic treatment tank 2 showed substantial improvement in quality, with a pH value of 6.1 to 7.4, a BOD of not more than 100 ppm, a TMAH of not more than 1 ppm, and an SS value of not more than 1 ppm.

In the first to third embodiments, thick sludge is produced by concentrating domestic sludge, It is understood, however, that the material for thick sludge is not limited to domestic sludge and may be any factory generated sludge. However, utilization of domestic sludge as material for thick sludge is advantageous in that the domestic sludge as such material is easier to obtain, and in that domestic sludge contains phosphorus and a moderate degree of SS which can enhance microbial growth and propagation.

As is apparent from the foregoing description, the wastewater treatment method in accordance with the present invention comprises concentrating sludge by means of a first submerged membrane to produce thick sludge, mixing the thick sludge into a water to be treated and introducing the water to be treated which is so mixed with thick sludge into an anaerobic treatment portion for anaerobically treating the same, and introducing the anaerobically treated water from the anaerobic treatment portion into an aerobic treatment portion having a second submerged membrane disposed therein to subject the water to aerobic treatment.

According to the wastewater treatment method of the invention, the water to be treated and thick sludge produced through concentration by the submerged membrane are previously mixed together. Therefore, organic substances, such as oil and fatty matter, contained in the water to be treated can be adsorbed onto the thick sludge. Meanwhile, dissolved oxygen in the water to be treated is digested by anaerobic microorganisms in the thick sludge, with the result that the dissolved oxygen content is reduced to zero. Thus, with the thick sludge and the to-be-treated water thoroughly mixed together, the resulting thick-sludge containing water, in which dissolved oxygen content has bee reduced to zero, is introduced into the anaerobic treatment portion.

According to the invention, therefore, into the anaerobic treatment portion is introduced water under treatment that has been pretreated to a dissolved oxygen free level and whose organic contents, such as oil and fatty matter, have been adsorbed onto thick sludge. Thus, according to the invention, it is possible to prevent any decrease in the permeation efficiency of the second submerged membrane without involving increased operating expenditure and sludge generation, and to efficiently treat high concentration organic wastewater without dilution.

In an embodiment, the organic wastewater treatment method is such that thick sludge is generated by concentrating domestic sludge by means of the first submerged membrane.

Domestic sludge as concentrated by means of the submerged membrane can concentrate MLSS up to a level of 20000 to 30000 ppm. The resulting high concentration thick sludge has the following features: (1) the thick sludge contains phosphorus; (2) the thick sludge is capable of organic substance adsorption; (3) the thick sludge primarily contains SS (suspended solid); and in addition, (4) the thick sludge is capable of readily digesting dissolved oxygen.

Therefore, the thick sludge has a tar-like configuration, with a microbial concentration of 20000 ppm to 30000 ppm in MLSS, and is highly capable of organic substance adsorption. Therefore, the thick sludge can adsorb organic substances, such as oil and fatty matter, in the water being treated in a more efficient manner and, in addition, can reduce the dissolved oxygen in the water to zero in a short time period. Further, the thick sludge, which is primarily domestic sludge, contains therein phosphorus and an adequate quantity of SS and can enhance microbial growth and propagation within the anaerobic treatment portion even if the water to be treatment is a developer liquor-containing wastewater which has no phosphorus or SS content.

According to an embodiment, thick sludge formed through concentration by the first submerged membrane and thick sludge formed through concentration by the second submerged membrane are mixed into the water to be treated, and the water to be treated which has been so mixed with the thick sludge is introduced into the anaerobic treatment portion for anaerobic treatment.

According to this embodiment, the thick sludge contains sludge originating from the water being treated, so that the thick sludge is inured to the characteristic configuration of the water being treated. This provides for improvement in anaerobic treatment efficiency. At the same time, any surplus domestic sludge can be utilized for purposes of treating organic wastewater, which in effect means effective resource utilization.

Also, the organic wastewater treatment apparatus of the invention comprises a concentration tank for concentrating sludge by means of a first submerged membrane to produce thick sludge; an organic matter adsorption tank for receiving thick sludge from the concentration tank and organic wastewater as water to be treated, mixing the thick sludge and the organic waste water together, thereby causing organic matter contained in the organic wastewater to be adsorbed on the thick sludge; and an anaerobic-aerobic treatment tank including an anaerobic treatment portion into which organic wastewater mixed with the thick sludge is introduced from the organic matter adsorption tank, and an aerobic treatment portion into which an anaerobically treated water is introduced from the anaerobic treatment portion, the aerobic treatment portion including a second submerged membrane.

According to the organic wastewater treatment apparatus of this invention, the water to be treated is treated so that organic substances, such as oil and fatty matter, are adsorbed by thick sludge and, in addition, dissolved oxygen is reduced to zero. After having undergone such pretreatment, the organic wastewater is introduced into the anaerobic treatment portion. Therefore, it is possible to treat the organic wastewater in an efficient manner and without any decrease in the permeation efficiency of the second submerged membrane due to the organic wastewater. According to this invention, the organic wastewater is treated with a thick sludge such that its microbial concentration has been exceedingly enhanced through the utilization of the first submerged membrane and, therefore, it is possible not only to positively treat TMAH in a high concentration developer liquor-containing wastewater, but also to positively treat even surfactant contained therein.

Therefore, according to this invention, it is possible to provide a compact wastewater treatment apparatus which can efficiently treat high concentration organic wastewater without dilution, and which requires less capital expenditure and less operating cost.

According to an embodiment, domestic sludge, as material sludge, is introduced into the concentration tank in which the domestic sludge is concentrated by means of the first submerged membrane.

According to this embodiment, the concentration tank can provide an anaerobic domestic sludge which is highly capable of dissolved oxygen digestion and has a tar-like configuration. A high concentration domestic sludge is mixed with the water to be treated in the organic matter adsorption tank. The high concentration domestic sludge has the following features: (1) the sludge contains phosphorus, (2) the sludge is capable of organic matter adsorption, (3) the sludge primarily contains SS, and in addition, (4) the sludge is capable of readily digesting dissolved oxygen. A water-sludge mixture from the organic matter adsorption tank in which the high concentration domestic sludge and the water to be treated are mixed together is introduced into the anaerobic treatment portion for anaerobic treatment. According to this embodiment, therefore, the anaerobic treatment capability of the anaerobic treatment portion is improved, and the permeation efficiency of the second submerged membrane in the following aerobic treatment portion can be maintained at a higher level.

An organic wastewater treatment apparatus of an embodiment includes a sludge return device for introducing into the concentration tank a thick sludge resulting from concentration effected by the second submerged membrane in the anaerobic-aerobic treatment tank.

According to this embodiment, a thick sludge as concentrated by the second submerged membrane which has been inured to the configuration of the water under treatment is returned by the sludge return device to the concentration tank. The so returned thick sludge is introduced into the anaerobic treatment portion via the concentration tank and the organic matter adsorption tank. Thus, the anaerobic treatment portion can efficiently perform anaerobic treatment with the thick sludge which is inured to the configuration of the water under treatment.

The entire system of the apparatus of the invention functions as a recycling system and, therefore, by adjusting the inflow quantity of water to be treated, the input quantity of thick sludge, the quantity of sludge return, etc. it is possible to advantageously control sludge concentration in each of the organic matter adsorption tank, concentration tank, and anaerobic-aerobic treatment tank.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for organic wastewater treatment comprising:
   concentrating sludge by means of a first submerged membrane to produce thick sludge;
   mixing the thick sludge into a water to be treated, and introducing the water to be treated which is so mixed with thick sludge into an anaerobic treatment portion for anaerobically treating the water, and
   introducing the anaerobically treated water from the anaerobic treatment portion into an aerobic treatment portion having a second submerged membrane disposed therein to subject the water to aerobic treatment.

2. A method for organic wastewater treatment as set forth in claim 1, wherein:
   the thick sludge is produced by concentrating a domestic sludge by means of the first submerged membrane.

3. A method for organic wastewater treatment as set forth in claim 1, wherein:
   the thick sludge produced by sludge concentration by means of the first submerged membrane, and a thick sludge produced by sludge concentration by means of the second submerged membrane, are mixed into the water to be treated, and the water to be treated which is so mixed with thick sludges is introduced into the anaerobic treatment portion for being subjected to anaerobic treatment.

4. An apparatus for organic wastewater treatment comprising:
   a concentration tank for concentrating sludge by means of a first submerged membrane to produce thick sludge;
   an organic matter adsorption tank for receiving the thick sludge from the concentration tank and organic wastewater as water to be treated, mixing the thick sludge and the organic wastewater together, thereby causing organic matter contained in the organic wastewater to be adsorbed on the thick sludge; and
   an anaerobic-aerobic treatment tank including an anaerobic treatment portion into which organic wastewater mixed with the thick sludge is introduced from the organic matter adsorption tank, and an aerobic treatment portion into which an anaerobically treated water is introduced from the anaerobic treatment portion, the aerobic treatment portion including a second submerged membrane.

5. An apparatus for organic wastewater treatment as set forth in claim 4, wherein:
   the concentration tank receives a sludge from a source of domestic sludge for concentration therein by means of the first submerged membrane.

6. An apparatus for organic wastewater treatment as set forth in claim 4, further comprising:
   a sludge return device for introducing the thick sludge produced by the second submerged membrane of the anaerobic-aerobic treatment tank into the concentration tank.

\* \* \* \* \*